May 23, 1950
L. D. SODITCH ET AL
2,508,974
LANTERN HOLDER
Filed Nov. 24, 1948
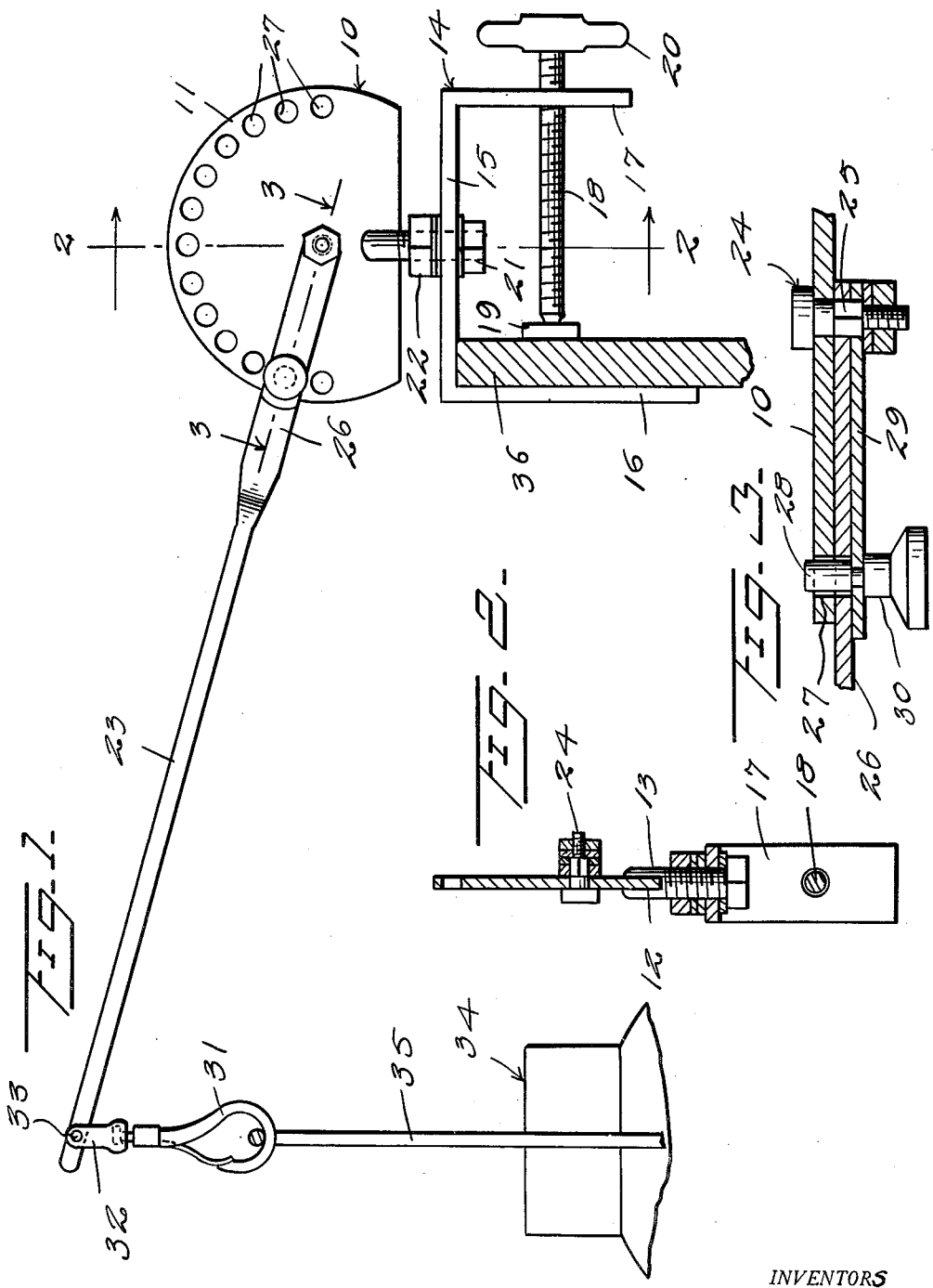
INVENTORS
Lewis D. Soditch
BY M. O. Scott
Kimmel & Crowell Attys.

Patented May 23, 1950

2,508,974

UNITED STATES PATENT OFFICE 2,508,974

LANTERN HOLDER

Lewis D. Soditch and Max Owen Scott, South Amherst, Ohio; said Scott assignor of one-half to said Soditch and one-half to Lyle Chandler Application November 24, 1948, Serial No. 61,804

1 Claim. (Cl. 248—42)

This invention relates to an article suspension means.

An object of this invention is to provide an article suspension means which is designed for suspending lanterns or other articles from a support, so that the article can freely swing relative to the support, the suspension means being so constructed that it may be clamped to a suitable support, and the article supporting arm angularly adjusted to the desired angle.

Another object of this invention is to provide a suspension means embodying a base adapted to be clamped onto a support, with an elongated suspension arm pivotally mounted on the base and spring-pressed latching means whereby the suspension arm may be angularly adjusted to any desired angle with respect to the base.

With the above and other objects in view, my invention consists in the arrangement, combination and details of construction disclosed in the drawing and specification, and then more particularly pointed out in the appended claim.

In the drawing,

Figure 1 is a detail side elevation of a lantern or article suspension means constructed according to an embodiment of our invention, showing the suspension means in operative position, secured to a support which is partly broken away and in section, and supporting an article which is partly broken away and in section, Figure 2 is a sectional view taken on the line 2—2 of Figure 1, Figure 3 is a fragmentary sectional view taken on the line 3—3 of Figure 1.

Referring to the drawing, the numeral 10 designates generally a vertically disposed plate which is formed with an arcuate marginal edge 11 and is of fragmentary disc-shape. The plate 10 is fixed in the bifurcated upper end 12 of a bolt 13, being secured in the slot or bifurcation of bolt 13 by soldering, welding or other suitable fastening means.

A clamp generally designated as 14 is secured to the bolt 13 and includes a U-shaped member having a bight 15 through which the bolt 13 extends. The clamp 14 includes an elongated jaw 16 formed integral with the bight 15, and a second jaw 17 which may be substantially shorter in length than the jaw 16. A clamping screw 18 having a swivelled head 19 is threaded through the jaw 17, and has fixed thereto a handle 20.

The bolt 13 has a head 21 disposed below the bight 15 and a nut 22 is threaded onto the bolt 13 and engages on the upper side of the bight 15 so that the plate 10 may be angularly adjusted relative to the clamp 14 about the vertical axis of the bolt 13.

An elongated article supporting arm 23 is pivotally mounted on a pivot bolt 24 which extends through the axial center of the plate 10. The bolt 24 is formed with a polygonal shank 25, as shown in Figure 3, so that the inner flat end 26 of the supporting arm 23 will be non-rotatable with respect to the bolt 24.

The plate 10 is formed with an arcuate series of openings or keepers 27 within a selected one of which a spring-pressed latching bolt 28 is adapted to engage. The bolt 28 is carried by an elongated flat spring 29 which is disposed in face abutting relation to the flat inner end portion 26 of arm 23, and the inner end of spring 29 engages the polygonal portion 25 of bolt 24 so that spring 29 will also be non-rotatable with respect to bolt 24.

A knob 30 is fixed to the bolt 28 and provides a means whereby the spring 29 may be flexed outwardly or laterally with respect to the plate 10 so as to withdraw bolt 28 from a selected opening 27 and permit arm 23 to be swung vertical with the axis of bolt 24 as a fulcrum.

The outer end of the arm 23 has secured thereto a spring clip 31 which is swivelly carried by a clevis 32 pivotally secured on a pivot member 33 engaging through the outer or forward end of arm 23. An article such as a lantern 34 having a bail 35 may be engaged with the clip or clasp 31 so that the article 34 will be suspendingly carried by arm 23 in a position spaced from a fixed support such as support 36.

In the use and operation of this device, the clamp 14 may be engaged with a suitable support such as a barrier forming member or a fixed board such as 36. The supporting arm 23 is vertically adjusted by pulling the bolt 28 out of an opening 27 and then vertically rocking or adjusting arm 23. This arm 23 may be adjusted to either side of the support 36 so that the supported article 34 will be suspended in the desired position.

We do not mean to confine ourselves to the exact details of construction herein disclosed, but claim all variations falling within the purview of the appended claim.

What we claim is:

An article support comprising an upright plate of partly disc-shape and formed with an arcuate series of keeper openings, clamping means fixed to said plate for securing the latter to a support, an elongated transversely resilient article suspension arm pivotally carried by said plate, means carried by the outer end of said arm for detachably suspending an article from said arm, and a latching bolt carried by said arm and engageable with a selected one of said keeper openings for releasably locking the latter in angularly adjusted position.

LEWIS D. SODITCH.
MAX OWEN SCOTT.

REFERENCES CITED

The following references are of record in the file of this patent:

UNITED STATES PATENTS

| Number | Name | Date |
|---|---|---|
| 122,370 | Doolittle | Jan. 2, 1872 |
| 257,050 | Munson | Apr. 25, 1882 |
| 2,461,356 | Sus et al. | Feb. 8, 1949 |